March 19, 1963     F. L. MONOHAN     3,081,863
AUTOMATIC RANDOM WIDTH AND RANDOM THICKNESS LUMBER FEEDER
Filed Aug. 22, 1960
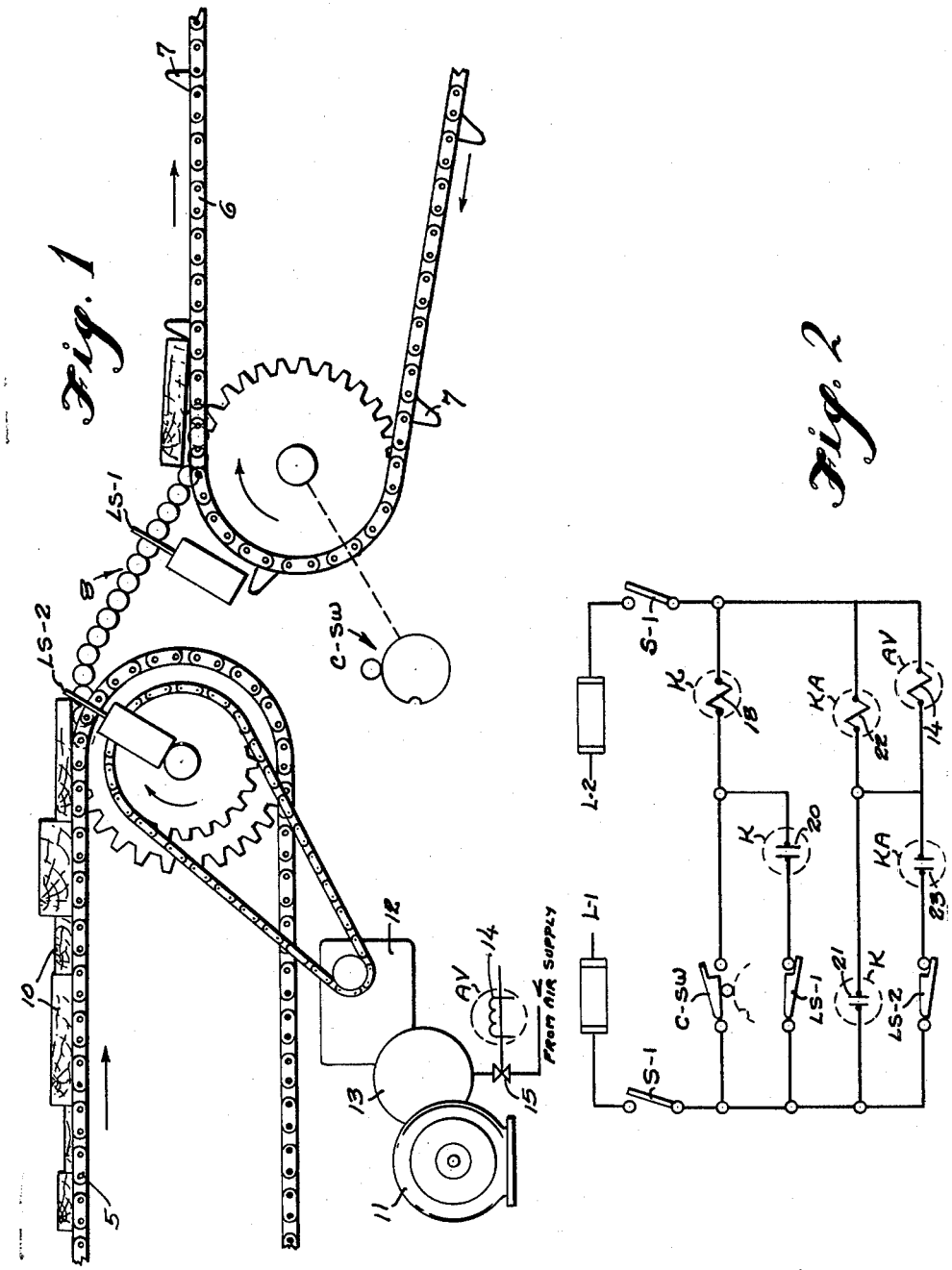
INVENTOR.
Franklin L. MONOHAN
BY
ATTORNEYS United States Patent Office 3,081,863
Patented Mar. 19, 1963

3,081,863
AUTOMATIC RANDOM WIDTH AND RANDOM THICKNESS LUMBER FEEDER
Franklin L. Monohan, Mercer Island, Wash., assignor of one-half to Republic Electric & Development Co., Seattle, Wash., a corporation of Washington, and one-half to Puget Sound Fabricators, Inc., Seattle, Wash., a corporation of Washington
Filed Aug. 22, 1960, Ser. No. 51,155
13 Claims. (Cl. 198—34)

This invention relates to an automatic feeder for lumber and analogous articles of random width and random thickness, having for its principal object the provision of a reliable system of simple and inexpensive construction which will feed a succession of boards, one at a time, and irrespective of variations in the width or thickness of the individual boards or their proximity to one another, from one to another of two successive conveyors. The invention further aims to provide a system particularly engineered for use with conveyor equipment of a type which has become more or less standard in the lumber industry, and namely one in which lumber advancing on the upper run of a smooth chain is delivered to the upper run of a lug chain occupying a lower level.

The invention has the still further and important object of providing an automatic feeder including an electrically controlled mechanism for interruptedly establishing a driving connection from a source of power to the smooth chain in response to impulses transmitted by successive lugs of the lug chain, and for arresting the travel of said smooth chain in response to impulses transmitted by each of a succession of the boards as the same arrive at the tail end of the smooth chain for discharge, in the next following cycle, onto the lug chain.

With these and other still more particular objects and advantages in view and which will appear and be understood in the course of the following description and claims, the invention consists in the novel construction and in the adaptation and combination of parts hereinafter described and claimed.

In the accompanying drawings:
FIGURE 1 is a schematic illustration of the mechanism of a lumber feeding system constructed to embody the preferred teachings of the present invention; and
FIG. 2 is a diagram of an electrical circuit employed in conjunction with the mechanism shown in FIG. 1.

It is believed that clarity in an understanding of the present invention will be advanced by considering the feeder as being employed to feed lumber of random width and thickness which has issued, say, from a mill's planer equipment. The present equipment, as with most existing feeders, provides two endless in-line power-driven conveyor chains designated by the numerals 5 and 6. Chain 5 is a smooth chain onto which the lumber feeds as it issues from the planer. The lumber passes from the tail end of this chain onto the head end of the other chain 6. Chain 6 is fitted with lumber-propelling lugs 7 spaced at equidistant intervals of the length. Referring to chain 5 as a "friction" chain and the chain 6 as a "pusher" chain will functionally distinguish the two for purposes of description.

According to the present invention the pusher chain has its head end spaced longitudinally beyond the tail end of the friction chain, and locates its upper run on a level spaced somewhat below the upper run of the friction chain. In the space therebetween there is provided an inclined roll case 8 by which successive pieces of lumber 10 are fed by gravity from the friction chain 5 into the interstices between successive lugs of the pusher chain. A single electric motor 11 may be used to drive both chains but in the instance of the pusher chain the drive is continuous whereas the friction chain is interruptedly driven with power being passed to the input end of a reduction gear box 12 by an electrically controlled clutch 13. I have shown the clutch as being an air clutch operated from a pressure source of air supply and the control as an electric coil 14 operating, when energized, to open a normally closed valve 15 introduced in the air supply pipe 16.

The present system incorporates three mechanically operated electric switches. One of these switches is a trigger cam switch C-SW which is normally open and has a synchronized interconnection with the lugs of the pusher chain so that as each of the successive lugs traverses a given station the switch momentarily completes an electric circuit from a suitable source of electric power. Such electric circuit includes the usual manually operated double-pole master switch S-1, a respective one of whose two poles are introduced in the two lines which lead from the two sides L-1 and L-2 of said power source. Such momentarily completed circuit includes the coil 18 of an electric relay K. Relay K seals through the series association its own contacts 20 and the contacts of a limit switch LS-1. This switch LS-1 and a second limit switch LS-2 are the other two of the three mechanically operated switches hereinbefore referred to, each being connected normally closed and opened when struck by a board traversing the roll case 8. Switch LS-2 is located at the top of the roll case ramp, switch LS-1 part way down.

Reverting to the circuitry, relay K provides an additional set of contacts 21 closed by an energizing of the coil 18 and such latter contacts serve as a circuit-closing switch for the coil 22 of a second electric relay KA. Relay KA, when its coil 22 is energized seals through the series association of its own contacts 23 and the limit switch LS-2. Connected in parallel with relay KA is the coil 14 of an electric solenoid control AV for the air valve 15. The air valve 15 is caused to open when the relay KA is operated in that such valve opens and closes as the coil 14 of the control AV is energized and de-energized, respectively.

From the foregoing it will be seen that as air pressure is supplied to the clutch 13 the friction chain 5 is driven. The first board in position is pushed onto the ramp and feeds by gravity to the pusher chain 6, moving with the latter by the pushing force of a lug which is brought to bear against the rear edge. As the board traversed the ramp it will have operated the limit switch LS-1 to break the seal path for relay K, thus releasing the latter. The friction chain 5 continues to move, however, in that relay KA is sealed up through the combination of its own contacts and those of limit switch LS-2 located at the top of the ramp.

The next board to be dispatched proceeds toward the ramp until the limit switch LS-2 is reached, whereupon the operation of such switch interrupts the seal path and the circuit to electric control AV thereupon becomes open so as to de-energize the coil 14 of solenoid AV. Air valve 15 thereupon closes and stops chain 5 with the said board in position at the head of the ramp ready for discharge when the next impulse, triggered by an advancing lug of the chain 6, again excites the relay K to initiate another cycle of the electric circuit for said solenoid 14. While the speeds at which the two chains are driven is in no sense critical, I find that for feeding lumber a suitable speed for the friction chain is six inches per second. The pusher chain may be driven at any speed ranging to a maximum velocity of approximately eighty lugs per minute. The inclination of the ramp should be such that the boards travelling over the same will not have their leading edge damaged in consequence of striking a lug at an unduly high speed.

It is believed that the invention will have been clearly understood from the foregoing detailed description of the now preferred illustrated embodiment of the invention. Changes in details will suggest themselves and it is my intention, therefor, that no limitations be implied and that the hereto annexed claims be given the broadest interpretation to which the employed language fairly admits.

What I claim is:

1. An automatic lumber feeder comprising, in combination with an endless feed conveyor having its upper run occupying the upper of two levels and acting by friction to convey a succession of boards along its length, a ramp occupying an in-line position at the tail end of the feed conveyor to receive boards discharged therefrom, an endless delivery conveyor occupying the lower of said two levels in position to receive boards from the ramp, means for continuously driving the delivery conveyor, normally inactive means for driving the feed conveyor, and means for controlling the drive to the feed conveyor so that the delivery conveyor will advance predetermined uniform distances between delivery thereto of successive boards from the feed conveyor, said controlling means comprising: a first electric relay, means energizing said relay momentarily as the receiving conveyor advances said predetermined distance, a first and a second normally closed limit switch each momentarily opened by engagement of a board therewith and placed to occupy positions in the path travelled by the boards the latter as a board reaches the head end of the ramp and the former as a board slides down the ramp, said first limit switch acting in combination with contacts of said electric relay to seal said relay and energize a normally released second electric relay, said second limit switch acting in combination with a set of contacts of the second said relay to seal said second relay, and normally inactive means made to respond to the operation of the second relay and operatively interconnected with the feed conveyor driving means for operating the feed conveyor driving means during periods when said second relay is energized.

2. An automatic lumber feeder comprising, in combination with an endless feed conveyor having its upper run occupying the upper of two levels and acting by friction to convey a succession of boards along its length, a ramp occupying an in-line position at the tail end of the feed conveyor to receive boards discharged therefrom, an endless delivery conveyor occupying the lower of said two levels in position to receive boards from the ramp, means for continuously driving the delivery conveyor, normally inactive means for driving the feed conveyor, and means for controlling the drive to the feed conveyor so that the delivery conveyor will advance predetermined uniform distances between delivery thereto of successive boards from the feed conveyor, said controlling means comprising: a first electric relay, means energizing said relay momentarily as the receiving conveyor advances said predetermined distance, a first and a second normally closed limit switch each momentarily opened by engagement of a board therewith and placed to occupy positions in the path travelled by the boards the latter as a board reaches the head end of the ramp and the former as a board slides down the ramp, said first limit switch acting in combination with contacts of said electric relay to seal said relay and energize a normally released second electric relay, said second limit switch acting in combination with a set of contacts of the second said relay to seal said second relay, and an electric device wired in parallel with said second relay so as to be energized in concert therewith and so operatively interconnected with the feed conveyor driving means as to activate the latter during periods when such electric device is energized.

3. An automatic lumber feeder comprising, in combination with an endless feed conveyor having its upper run occupying the upper of two levels and acting by friction to convey a succession of boards along its length, a ramp occupying an in-line position at the tail end of the feed conveyor to receive boards discharged therefrom, an endless delivery conveyor occupying the lower of said two levels in position to receive boards from the ramp, means for continuously driving the delivery conveyor, normally inactive means for driving the feed conveyor, and means for controlling the drive to the feed conveyor so that the delivery conveyor will advance predetermined uniform distances between delivery thereto of successive boards from the feed conveyor, said controlling means comprising: a first and a second normally released electric relay, a normally open circuit-closing switch wired in series with the coil of said first relay, means momentarily closing said switch as the delivery conveyor successively advances said predetermined distances, an upper and a lower normally closed limit switch each momentarily opened by engagement of a board therewith and placed to occupy positions in the path travelled by the boards the upper as a board reaches the head end of the ramp and the lower as a board slides down the ramp, said lower limit switch acting in combination with contacts of said first electric relay to seal said relay and energize said second relay, said upper limit switch acting in combination with a set of contacts of said second relay to seal said second relay, normally inactive means operatively associated with said second relay so as to be activated in concert with the energizing of the latter, and means operatively interconnecting the last named means with the feed conveyor driving means causing the feed conveyor to be driven upon activation of said means.

4. Structure according to claim 3 in which the delivery conveyor provides pusher lugs spaced said predetermined uniform distances about the circumference of the delivery conveyor.

5. An automatic lumber feeder comprising, in combination with an endless power-driven feed conveyor acting by friction to convey a succession of boards, a walk-way receiving boards from the feed conveyor and delivering the same to the head end of an endless power-driven delivery conveyor, means for continuously driving the delivery conveyor, normally inactive means for driving the feed conveyor, and means for controlling the drive to the feed conveyor so that each of a succession of single boards will be fed to the walk-way and thence to the delivery conveyor each time the latter travels a predetermined distance, said controlling means comprising: a first and a second normally released electric relay, a normally open circuit-closing switch wired in series with the coil of said first relay, means momentarily closing said switch as the delivery conveyor successively advances said predetermined distances, a first and a second normally closed limit switch each momentarily opened by engagement of a board therewith and placed to occupy positions in the path travelled by the boards, the first switch as a board proceeds along the walk-way and the second switch as a board reaches the tail end of the feed conveyor, a normally incomplete electric circuit including the coil of said first relay in series with said circuit-closing switch, a normally incomplete electric circuit including said first limit switch in series with a set of normally open contacts of said first relay functional to seal said relay, a normally incomplete electric circuit including a second set of normally open contacts of said first relay in series with the coil of said second relay, a normally incomplete electric circuit including said second limit switch in series with a set of normally open contacts of said second relay functional to seal said second relay, and an electric device wired in parallel with the coil of said second relay and operatively interconnected with the feed conveyor drive means for activating said feed conveyor drive means when said electric device is energized.

6. An automatic lumber feeder comprising, in combination with a power-driven endless delivery conveyor receiving boards from the tail end of a power-driven endless feed conveyor, and the power means for driving said conveyors, means for interruptedly driving the feed conveyor so that the same will feed to the delivery conveyor only a single board each time the delivery conveyor advances a predetermined distance, said means comprising: a first and a second normally closed limit switch each momentarily opened by engagement of a board therewith and placed to occupy positions in the path travelled by the boards the first limit switch approximately upon delivery of a board to the delivery conveyor and the second limit switch as a board reaches the tail end of the feed conveyor, a first and a second normally released electric relay, a normally incomplete electric circuit including the coil of said first relay in series with a circuit-closing switch closed momentarily upon each advance of the delivery conveyor said predetermined distance, a normally incomplete electric circuit including said first limit switch in series with a set of normally open contacts of said first relay which seal said relay, a normally incomplete electric circuit including a second set of normally open contacts of said first relay in series with the coil of said second relay, a normally incomplete electric circuit including said second limit switch in series with a set of normally open contacts of said second relay which seal said relay, and an electric device wired in parallel with the coil of said second relay and operatively interconnected with the feed conveyor drive means for activating said feed conveyor drive means when said electric device is energized.

7. An automatic lumber feeder comprising in combination with an endless feed conveyor acting by friction to convey a succession of boards along its length, and an endless delivery conveyor disposed in in-line relation to the feed conveyor in a position to receive upon its head end boards discharged from the tail end of said feed conveyor, means for driving the delivery conveyor, means for driving the feed conveyor, means operated at predetermined separated intervals co-ordinated with the forward progress of the delivery conveyor for activating the feed conveyor driving means so that a first board occupying a position at the tail end of the feed conveyor will be then fed from the feed conveyor onto the delivery conveyor, and means operated by a next following board as it reaches said tail end of the feed conveyor for inactivating said feed conveyor driving means.

8. An automatic lumber feeder comprising, in combination with an endless feed conveyor having its upper run occupying the upper of two levels and acting by friction to convey a succession of boards along its length, a ramp disposed in in-line relation to the feed conveyor extending downwardly from the tail end of the latter between said upper and lower levels, and an endless delivery conveyor also disposed in in-line relation to the feed conveyor with its upper run occupying the lower of said two levels in a position to receive boards discharged from the lower end of said ramp, means for driving the receiving conveyor, means for driving the feed conveyor, means operated at predetermined separated intervals co-ordinated with the forward progress of the receiving conveyor for activating the feed conveyor driving means so that a first board occupying said conveyor at its tail end will be fed from the feed conveyor onto the ramp and thence to the delivery conveyor, and means operated by a next following board as it reaches said tail end of the feed conveyor for inactivating said feed conveyor driving means.

9. Structure according to claim 8 in which the means operated by said next following board includes a limit switch, and wherein said means which activates the feed conveyor driving means also includes a limit switch, the two limit switches being each a normally closed switch opened momentarily as a board traverses the same.

10. The combination with an endless conveyor acting by fricton to feed a succession of boards along its length, and a walk-way receiving boards as the latter clear the tail end of the conveyor and moving the same to a receiving station, means including an electric device the energizing of which drives the conveyor, a first-acting and a second-acting normally closed limit switch each momentarily opened by engagement of a board therewith and placed to occupy positions in the path travelled by said boards said first-acting limit switch as a board progresses along the walk-way and said second-acting limit switch as a board moving with the conveyor reaches the tail end thereof, a normally released electric relay, a normally incomplete electric circuit including the coil of said relay in series with a circuit-closing switch, means for closing said circuit-closing switch at predetermined intervals, a normally incomplete electric circuit including the first-acting limit switch in series with a circuit-completing set of normally open contacts of said relay which are also functional to seal said relay, a normally incomplete electric circuit including another circuit-completing set of normally open contacts of said relay in series with said electric device, and a normally incomplete electric circuit including said electric device in series with said second-acting limit switch.

11. The combination with an endless conveyor acting by friction to feed a succession of boards along its length, and a walk-way receiving boards as the latter clear the tail end of the conveyor and moving the same to a receiving station, means including an electric device the energizing of which drives the conveyor, a first acting and a second-acting normally closed limit switch each momentarily opened by engagement of a board therewith and placed to occupy positions in the path travelled by said boards said first-acting limit switch as a board progresses along the walk-way and said second-acting limit switch as a board moving with the conveyor reaches the tail end thereof, a normally released electric relay, a normally incomplete electric circuit including the coil of said relay in series with a circuit-closing switch, means for closing said circuit-closing switch at predetermined intervals, a normally incomplete electric circuit including the first-acting limit switch in series with a circuit-completing set of normally open contacts of said relay which are also functional to seal said relay, a normally incomplete electric circuit including another circuit-completing set of normally open contacts of said relay in series with the coil of a second normally released electric relay, a normally incomplete series electric circuit including said electric device completed by a closing of the last-named set of relay contacts, and two normally incomplete electric circuits one bringing said electric device and the other bringing the coil of said second relay into series with both the second-acting limit switch and with a circuit-completing set of normally open contacts of said second relay which are also functional to seal said second relay.

12. The combination with an endless conveyor acting by friction to feed a succession of boards along its length, and a walk-way receiving boards as the latter clear the tail end of the conveyor and moving the same to a receiving station, means including an electric device the energizing of which drives the conveyor, a first-acting and a second-acting normally closed limit switch each held open by engagement of a board therewith and placed to occupy positions in the path travelled by said boards said first-acting limit switch as a board progresses along the walk-way and said second-acting limit switch as a board moving with the conveyor reaches the tail end thereof, a normally open pilot electric switch closed momentarily at predetermined intervals, and means activated automatically for completing a circuit to the electric device when the pilot electric switch is closed and for then maintaining said circuit complete throughout a cycle during which the first-acting limit switch succesively opens and closes and the second-acting limit switch successively closes and opens.

13. The combination with an endless conveyor acting by friction to feed a succession of boards along its length, and a walk-way receiving boards as the latter clear the tail end of the conveyor and moving the same to a receiving station, means including an electric device the energizing of which drives the conveyor, a first-acting and a second-acting normally energized proximity switch each opened by proximity of a board and placed to occupy positions adjacent the path travelled by said boards said first-acting switch such as to be opened as a board progresses along the walk-way and said second acting switch as a board moving with the conveyor reaches the tail end thereof, a normally open pilot electric switch closed momentarily at predetermined intervals, and means activated automatically for completing a circuit to the electric device when the pilot electric switch is closed and for then maintaining said circuit complete throughout a cycle during which the first-acting proximity switch successively opens and closes and the second-acting proximity switch successively closes and opens.

References Cited in the file of this patent
UNITED STATES PATENTS

| | | |
|---|---|---|
| 2,917,157 | Fitzgerald | Dec. 15, 1959 |
| 2,943,724 | McCoy | July 5, 1960 |